United States Patent
Koutsikos Tsatsalmas et al.

(10) Patent No.: US 11,522,799 B1
(45) Date of Patent: Dec. 6, 2022

(54) DYNAMICALLY MANAGED DATA TRAFFIC WORKFLOWS

(71) Applicant: Amazon Technologies, Inc., Seattle, WA (US)

(72) Inventors: Nikolaos Koutsikos Tsatsalmas, Vancouver (CA); Jacob Wires, Vancouver (CA); Marcin Marek Wolicki, Vancouver (CA); Jingmin Zhu, Burnaby (CA); Yuri Zarubin, Vancouver (CA); Leon Thrane, Issaquah, WA (US); Sidharth Bajaj, Vancouver (CA); Valeri Atamaniouk, Delta (CA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/917,679

(22) Filed: Jun. 30, 2020

(51) Int. Cl.
*H04L 47/125* (2022.01)
*H04L 47/2441* (2022.01)
*H04L 41/0604* (2022.01)
*H04L 47/50* (2022.01)
*H04L 47/2483* (2022.01)

(52) U.S. Cl.
CPC ........ *H04L 47/125* (2013.01); *H04L 41/0609* (2013.01); *H04L 41/0627* (2013.01); *H04L 47/2441* (2013.01); *H04L 47/2483* (2013.01); *H04L 47/50* (2013.01)

(58) Field of Classification Search
CPC .............. H04L 47/125; H04L 41/0627; H04L 47/2483; H04L 47/2441; H04L 47/50; H04L 41/0609
See application file for complete search history.

(56) References Cited

U.S. PATENT DOCUMENTS

| | | | |
|---|---|---|---|
| 3,583,327 | A | 6/1971 | Arndt |
| 7,908,449 | B2 | 3/2011 | Satoyama et al. |
| 8,301,593 | B2 | 10/2012 | Hoffmann et al. |
| 8,631,284 | B2 | 1/2014 | Stevens |
| 8,793,452 | B1 | 7/2014 | McCloskey et al. |
| 10,324,766 | B1 | 6/2019 | Karp et al. |
| 10,409,770 | B1 | 9/2019 | Ye |
| 10,621,147 | B1 | 4/2020 | Liang et al. |
| 10,831,549 | B1 | 11/2020 | Radhakrishnan et al. |
| 2002/0065849 | A1 | 5/2002 | Ferguson et al. |

(Continued)

OTHER PUBLICATIONS

U.S. Appl. No. 16/917,689, filed Jun. 30, 2020, Yuri Zarubin, et al.

(Continued)

*Primary Examiner* — Jamal Javaid
*Assistant Examiner* — Shawn D Miller
(74) *Attorney, Agent, or Firm* — S. Scott Foster; Kowert, Hood, Munyon, Rankin & Goetzel, P.C.

(57) ABSTRACT

Dynamic management of data traffic workflows is performed. An event to perform a data traffic workflow at a remote performance location may be received. Computing resources to perform the data traffic workflow may be identified. Operations to perform the data traffic workflow may be dynamically directed by the identified computing resources to adaptively balance performance of the operations with operations for other data traffic workflows in order to meet respective performance requirements of the data traffic workflows.

20 Claims, 9 Drawing Sheets

(56) References Cited

U.S. PATENT DOCUMENTS

| | | | |
|---|---|---|---|
| 2002/0169520 A1 | 11/2002 | Lamkin et al. | |
| 2009/0019443 A1 | 1/2009 | Jakob | |
| 2010/0180147 A1 | 7/2010 | Beeston et al. | |
| 2012/0017059 A1 | 1/2012 | Gold et al. | |
| 2013/0073724 A1* | 3/2013 | Parashar | G06F 9/5072 709/224 |
| 2016/0203069 A1 | 7/2016 | Gill et al. | |
| 2016/0306822 A1 | 10/2016 | Waghulde | |
| 2016/0371153 A1 | 12/2016 | Dornemann | |
| 2017/0004051 A1 | 1/2017 | Ren et al. | |
| 2018/0041866 A1* | 2/2018 | Doeweling | G06F 16/9535 |
| 2019/0058772 A1* | 2/2019 | Ruiz-Meraz | H04L 67/2842 |
| 2019/0243702 A1 | 8/2019 | Shilane et al. | |
| 2019/0278663 A1 | 9/2019 | Mehta et al. | |
| 2021/0029083 A1* | 1/2021 | Li | H04L 63/0236 |

OTHER PUBLICATIONS

"Routing'" Wikipedia; Aug. 18, 2020; retrieved from https://en.wikipedia.org/w/index.php? title=Routing&oldid=973668918, pp. 1-9.

* cited by examiner

US 11,522,799 B1

DYNAMICALLY MANAGED DATA TRAFFIC WORKFLOWS

BACKGROUND

A cloud provider, or other provider network, may implement multiple network-based services. These services may provide different functionality, such as computational resources, storage resources, data transmission, among various others. To implement various features, techniques for coordinating the performance of operations that implement the features among the services may be utilized.

Figure 1:
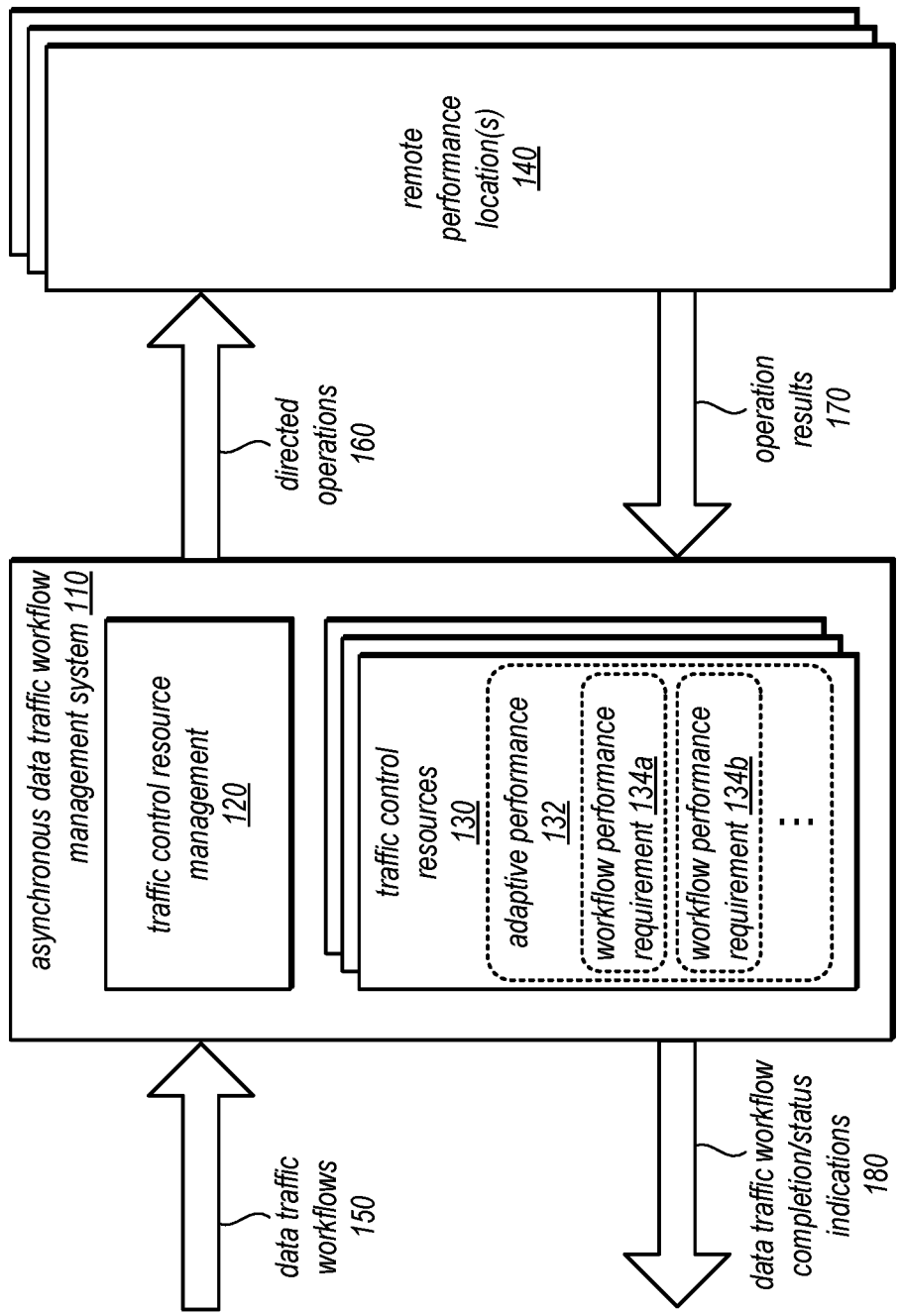
FIG. 1 illustrates a logical block diagram of dynamically managed data traffic workflows, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for dynamically managed data traffic workflows are described herein. Some features of different systems or services may include performing operations on a remote system or service in order to implement the feature, in some embodiments. These operations may have dependencies or other relationships between the performance of one operation and another operation, creating a data traffic workflow. Replication, for instance, may include multiple different operations to replicate a set of changes made to a source data object, creating a data traffic workflow. Performance of replication as a data traffic workflow may involve dependencies between the different operations, such as operations to create a new container or location, perform a copy of a new item into the container or location, validate correctness of the new item in the container, and so on, which may involve one, or multiple, systems or services.

Instead of placing the burden of directing the performance of remote of data traffic workflows directly upon the systems that trigger them, a workflow management system may coordinate the traffic to remotely perform the data traffic workflow. The triggering system or service may then treat performance of the data traffic workflow as an asynchronous event that will be handled by other systems so that operation of the triggering system or service is not impeded by or waiting upon the performance of data traffic workflows. Moreover, a separate system for coordinating performance of the data traffic for a workflow can operate dynamically in order to provide performance that meets or satisfies performance requirements, such as a service level agreement (SLA) for the feature that triggers the data traffic workflow (e.g., replication that is completed within a specified time limit).

FIG. 1 illustrates a logical block diagram of dynamically managed data traffic workflows, according to some embodiments. Asynchronous data traffic workflow management system 110 may provide dynamically adaptive data traffic management for data workflows 150, directing operations 160 for the data traffic workflows to remote performance location(s) 140, handling operation result(s) 170, and providing data traffic workflow completion/status indications 180, in various embodiments. In this way, asynchronous data traffic workflow management system 110 can provide an elastic workflow management engine to coordinate the data traffic workflow, including coordinating a data path of operations and requests, system inputs, outputs, and/or external dependencies in a controlled durable and transactional approach, in various embodiments. Moreover, as asynchronous data traffic workflow management system 110 may coordinate external (e.g., external to the asynchronous data traffic workflow management system 110) dependencies and balance system inputs and outputs, asynchronous data traffic workflow management system 110 can provide performant handling of data traffic workflows in multiple contexts, enhancing the performance of a system or service features that trigger data traffic workflows (e.g., improving the performance of replication for a storage service that offers and triggers replication using asynchronous data traffic workflow management system 110).

Asynchronous data traffic workflow management system 110 may manage the data traffic workflow and may not replicate the traffic itself, in some embodiments. To replicate the traffic, asynchronous data traffic workflow management system 110 may utilize remote systems or services as remote performance location(s) 140, in some embodiments. Asynchronous data traffic workflow management system 110 may coordinate operations for a data traffic workflow, as indicated at 160, through various internal and external dependencies (e.g., at remote performance locations 140). As discussed in detail below with regard to FIGS. 2-4 and 6-7, in some embodiments asynchronous data traffic workflow management system 110 may implement work partitions that are dynamically assigned, for example based on workload (and also may, in some embodiments, correspond to a particular sources and/or remote performance location(s) 140). As asynchronous data traffic workflow manager 110 may handle data traffic workflows in asynchronous fashion, asynchronous data traffic workflow manager 110 may handle multiple inputs, such as new/incoming traffic, retry traffic, and/or throttled traffic and outputs, in various embodiments.

Asynchronous data traffic workflow manager 110 may implement traffic control resource management 120, in some embodiments, which may manage the performance of data traffic workflows among various computing resources, such as traffic control resources 130. Traffic control resources 130 may provide adaptive performance 132 of data traffic workflows in order to satisfy different workflow performance requirements, such as workflow performance requirement 134*a* and 134*b* for separate data traffic workflows, in some embodiments. Adaptive performance 132 may provide fairness among input, retry and throttled operations for data traffic workflows, adapt ingestion and/or active/in-flight operations based on operation responses (e.g., from remote performance location(s) 140) to create a zero-sum balance of input and output. Adaptive performance 132 may handle multiple data traffic workflow assignments (e.g., different replication jobs for different services, systems, accounts, users, or applications), such as by using work partitions per traffic control resource(s) 130 for scalability as discussed below, and scale horizontally by changing the number of resources assigned to a work partition based on the workload directed to a work partition (e.g., to share increasing large workloads among multiple resources), in some embodiments.

Asynchronous data traffic workflow management 110 may also collect and maintain statistics on operations to provide traffic profiling to prioritize some operations, in some embodiments. Asynchronous data traffic workflow management 110 may also provide automated processes and operational tools to isolate, move or remove offending operations of workflows, in some embodiments.

Asynchronous data traffic workflow management system 110 may be implemented as part of private distributed systems or services, in some embodiments. In some embodiments, asynchronous data traffic workflow management system 110 may be implemented as a service, like data traffic workflow management service 210 in FIG. 2.

The previous description of asynchronous data traffic workflow management system 110 in FIG. 1 is a logical illustration and thus is not to be construed as limiting as to the architecture for implementing an asynchronous data traffic workflow management system 110. Various other arrangements of components to perform asynchronous and adaptive performance of data traffic workflows may be implemented in other embodiments.

This specification begins with a general description of a provider network that implements an asynchronous data traffic workflow management system to perform dynamic management of data traffic workflows as a service for different services across a provider network and/or provider network regions. Then various examples of the data traffic workflow management service including different components/modules, or arrangements of components/module that may be employed as part of implementing the data traffic workflow management service are discussed. A number of different methods and techniques to implement dynamically managed data traffic workflows are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
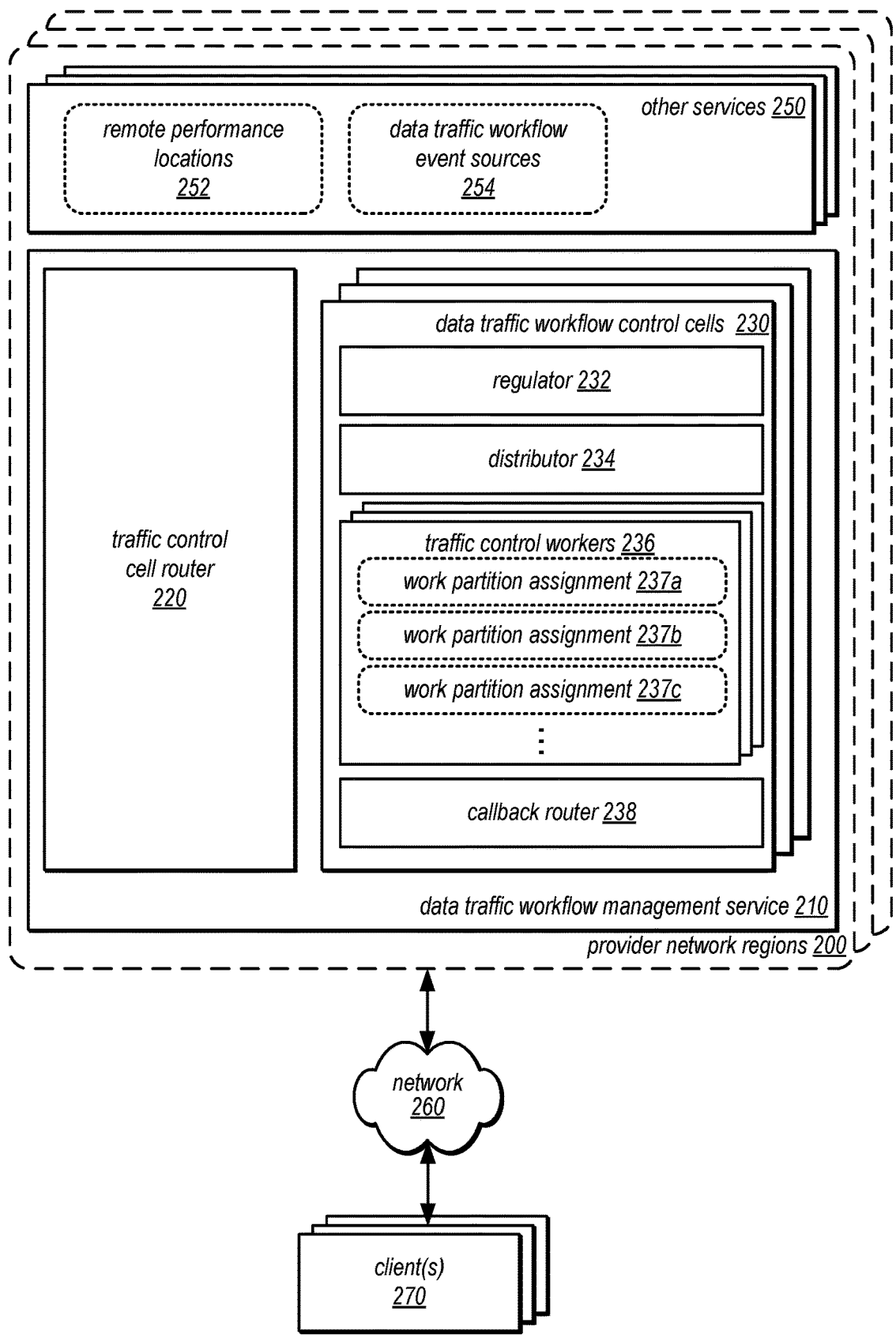
FIG. 2 is a logical block diagram illustrating a provider network implementing a data traffic workflow management service among other services, according to some embodiments.

FIG. 2 is a logical block diagram illustrating a provider network implementing a data traffic workflow management service among other services, according to some embodiments. In various embodiments, a provider network may be a private or closed system or may be set up by an entity such as a company or a public sector organization to provide one or more services (such as various types of cloud-based storage, processing, or other computing resources) accessible via the Internet and/or other networks to clients 270. The provider network may be implemented in a single location or may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and storage services offered by the provider network.

For example, the provider network (which may, in some implementations, be referred to as a "cloud provider network" or simply as a "cloud") may refer to a pool of network-accessible computing resources (such as compute, storage, and networking resources, applications, and services), which may be virtualized or bare-metal (e.g., providing direct access to underlying hardware without a virtualization platform). In this way, the provider network can provide convenient, on-demand network access to a shared pool of configurable computing resources that can be programmatically provisioned and released in response to customer commands. These resources can be dynamically provisioned and reconfigured to adjust to variable load.

The provider network can be formed as a number of regions, such as provider network regions 200, where a region may be a separate geographical area in which the provider network clusters or manages data centers, in some embodiments. Each region 200 may include two or more availability zones (sometimes referred to as fault tolerant zones) connected to one another via a private high speed network, for example a fiber communication connection. An availability zone (also known as an availability domain, or simply a "zone") may refer to an isolated failure domain including one or more data center facilities with separate power, separate networking, and separate cooling from those in another availability zone, in some embodiments. Preferably, availability zones within a region are positioned far enough away from one another that the same natural disaster should not take more than one availability zone offline at the same time, in some embodiments. Clients 270 can connect to availability zones of the provider network via a publicly accessible network (e.g., the Internet, a cellular communication network).

Regions 200 may be connected to a global network which includes private networking infrastructure (e.g., fiber connections controlled by the cloud provider) connecting each region to at least one other region, in some embodiments. The provider network may deliver content from points of presence outside of, but networked with, these regions 200 by way of edge locations and regional edge cache servers, in some embodiments. This compartmentalization and geographic distribution of computing hardware enables the provider network to provide low-latency resource access to customers on a global scale with a high degree of fault tolerance and stability.

In some embodiments, a provider network may implement various computing resources or services across one or more regions, such as data traffic workflow management service 210 and other services 250, which may include a virtual compute service, data processing service(s) (e.g., map reduce, data flow, and/or other large scale data processing techniques), data storage services (e.g., object storage services, block-based storage services, various types of database services (e.g., SQL, NoSQL, document, graph, time series, and so on), blob storage, or data warehouse storage services) and/or any other type of network-based services (which may include various other types of storage, processing, analysis, communication, event handling, visualization, and security services not illustrated). The resources used to support the operations of such services (e.g., compute and storage resources) may be provisioned in an account associated with the provider network, in contrast to resources requested by users of the provider network, which may be provisioned in user accounts, in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system 1000 illustrated in FIG. 9 and described below. In various embodiments, the functionality of a given system or service component (e.g., a component of identity and access management services 210 or other services 250) may be implemented by a particular node or may be distributed across several nodes. In some embodiments, a given node may implement the functionality of more than one service system component (e.g., more than one data store component).

Data traffic workflow management service 210 may implement techniques for dynamic management of data traffic workflows, as discussed above with regard to FIG. 1 and below with regard to FIGS. 3-8. Data traffic workflow management service 210 may implement traffic control cell router 220, in some embodiments. As discussed below with regard to FIG. 3, traffic control cell router 220 may be a front-end or other type of event dispatcher that accepts indications or other triggers of events for data traffic workflows for handling by data traffic workflow management service 210, in some embodiments. Traffic control cell router 220 may be implemented across one or multiple different nodes or groups/cells of nodes to handle high-throughput traffic from event trigger sources, data traffic workflow event sources 254, in some embodiments. In some embodiments, traffic control cell router 220 may filter or reject mal-formed, erroneous, or communications unrelated to data traffic workflow management. In some embodiments, traffic control cell router 220 may access metadata or other information to enhance or add to the information described in requests, which may be used to perform the data traffic workflows indicated by events. For example, traffic control cell router 220 may obtain access credentials, metadata descriptive of how operations are to be performed, or other data traffic workflow information, in some embodiments. Traffic control cell router 220 may route events to the appropriate data traffic workflow control cell 230 for an event according to various routing schemes, in some embodiments. For example, traffic control cell router 220 may utilize an identifier associated with an event (e.g., an account identifier) and/or a destination or location of remote performance locations 252 for the event, in some embodiments, (e.g., by applying a hash function to determine a cell).

In various embodiments, data traffic workflow management service 210 may implement data traffic workflow control cells 230. Data traffic workflow control cells 230 may be implemented to implement independent data traffic management resources which can dynamically manage the resources within the data traffic workflow control cells to meet performance requirements (e.g., Service Level Agreements (SLAs). For example, as discussed above, traffic control cell router 220 may choose (or send to) an data traffic workflow control cell 230 chose according to various schemes such as load-balancing schemes, allowing for work to be distributed a near balanced fashion.

Data traffic workflow control cells 230 may implement a regulator 232, in various embodiments. Regulator 232 may implement various management features for the data traffic workflow control cell (e.g., various control plane operations). In some embodiments, regulator may handle the provisioning, creating, or otherwise configuring of resources for performing data traffic workflows, in some embodiments (e.g., traffic control workers 236). Regulator 232 may communicate with traffic control workers 236 and other cell 230 components, such as distributor 234 or callback router 238 (or external components such as data stores utilized by a cell 230) using various protocols, such as heartbeat protocols to provide work partition assignments, like work partition assignments 237*a*, 237*b*, and 237*c*, detect, repair, and/or replace failed hosts for traffic control workers 236, among other communications. For example, in some embodiments, regulator 232 may release events worked on by a failed traffic control worker 236 back to an input queue to be obtained and worked on by another traffic control worker 236 assigned to the work partition. In another example, regulator 232 may assign a transaction per second (TPS) value to a work partition for traffic control workers 236 to apply as a capacity limit for that work partition at the traffic control workers.

Data traffic workflow control cells 230 may implement a distributor, like distributor 234, in various embodiments. Distributor 234 may serve as a front-end or other input control for cells 230, in some embodiments. For example, as discussed below with regard to FIG. 3, distributor 234 may read and/or pull from an input queue of events for cell 230, demultiplex the events to route them to the appropriate work partition (and, if necessary, obtain an assignment/creation of a new work partition). In some embodiments, distributor 234 may obtain work partition assignments 237 from regulator 232 for a data traffic workflow.

Data traffic workflow control cells 230 may implement a group or fleet of traffic control workers, like traffic control workers 236, in order to provide a set of resources that can be dynamically managed (e.g., assigned, repaired, and/or replaced) to perform operations for a data traffic workflow assigned to a work partition, as discussed in detail below with regard to FIGS. 3-7. Traffic control workers 236 may receive one (or multiple) work partition assignments 237 from regulator 232, in some embodiments.

A work partition may be, in some embodiments, a unit of processing isolation assigned to particular sources, users, accounts, types of workflow or some other grouping by which one or multiple events for data traffic workflows may be assigned for performance as part of the unit of processing isolation. A work partition may have data structures that can be read or updated by any assigned traffic control worker, such as a partition input queue and partition retry queue. These data structures may be stored separate from any individual traffic control worker (e.g., in a separate data store, such as a separate database table), in some embodiments. By assigning one (or more) traffic control workers 236 to a work partition, a work partition can be implemented to be elastic and are dynamically assigned sufficient resources (e.g., workers) to ingest from a backlog of data traffic workflows, prioritize operations between workflows and operations, batch operations, submit requests to perform tasks to remote operation execution resources at remote performance locations 252, adapt the workflow based on operation responses, collect statistics on operation performance for workflows, perform traffic shaping, redrive transient errors and ensure durability of workflow operations until completion of the workflow, in various embodiments.

In various embodiments, data traffic workflow control cells 230 may implement callback router 238. Callback router 238 may handle responses from requested operations at remote performance locations 252, in various embodiments. In this way, traffic control workers 236 can handle responses asynchronously to determine whether a data traffic workflow is complete, still pending, or needs to be retried, in some embodiments.

Data traffic workflow event sources 254 may be other services, systems, or components implemented as part of other services 250 (or external to provider network regions 200 (not illustrated) that cause or trigger data traffic workflow tasks, in some embodiments. For example, a data traffic workflow can be performed to replicate changes made to data in an identified storage location in a data storage service (e.g., one or more data objects stored in a container of an object-based store, such as various updates, additions, modifications, deletions, reformats, reassignments, and so on). In some embodiments, the event of a data traffic workflow may be communicated or sent to data traffic workflow management service via one or more intermediate communication systems or services.

Remote performance locations 252 may be may be other services, systems, or components implemented as part of other services 250 (or external to provider network regions 200 (not illustrated) that perform the requested operations of a data traffic workflow remote from the source of the event and remote from data traffic workflow management service 210 (e.g., via remote procedure calls or other network requests), in some embodiments. Consider the example above of a data traffic workflow to replicate changes to a data object in a data storage service. The changes to the data storage service may be replicated to another type of storage service or to a different instantiation of the same data storage service in different region 200 than the region of the event (e.g., replicate an update to an object stored in region A to a copy of the object stored in region B). In such an example, remote performance locations 252 may include a data transfer or replication service that can, for example, perform the operations to replicate the changes to the different region (e.g., receive and perform the operation to update the copy of the object stored in region B in accordance with a request received from a traffic control worker 236 assigned to the work partition for that data traffic workflow).

Generally speaking, clients 270 may encompass any type of client configurable to submit network-based requests to provider network regions 200 via network 260, including requests for other services 250 (e.g., a request to create a database, start a computation job, setup a data stream, or other request that causes a data traffic workflow event to be triggered). For example, a given client 270 may include a suitable version of a web browser, or may include a plug-in module or other type of code module configured to access a management console to configure a replication task for a data object and specify performance requirements for the task (e.g., replication complete within a given time limit) that is managed as an event for a data traffic workflow by data traffic workflow management service 210. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application configured to interact directly with provider network region 200. In some embodiments, client 270 may be configured to generate network-based services requests according to a Representational State Transfer (REST)-style network-based services architecture, a document-based or message-based network-based services architecture, or another suitable network-based services architecture. Although clients 270 are illustrated as external to provider network 200, in some embodiments clients of different services, like other services 250, can be implemented within provider network region 200 (e.g., implemented on a resource of another service 250, such as virtual compute instance).

Clients 270 may convey network-based services requests to and receive responses from provider network regions 200 via network 260. In various embodiments, network 260 may encompass any suitable combination of networking hardware and protocols necessary to establish network-based-based communications between clients 270 and provider network regions 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 270 and provider network region 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 270 and the Internet as well as between the Internet and provider network region 200. It is noted that in some embodiments, clients may communicate with provider network region 200 using a private network rather than the public Internet.

Figure 3:
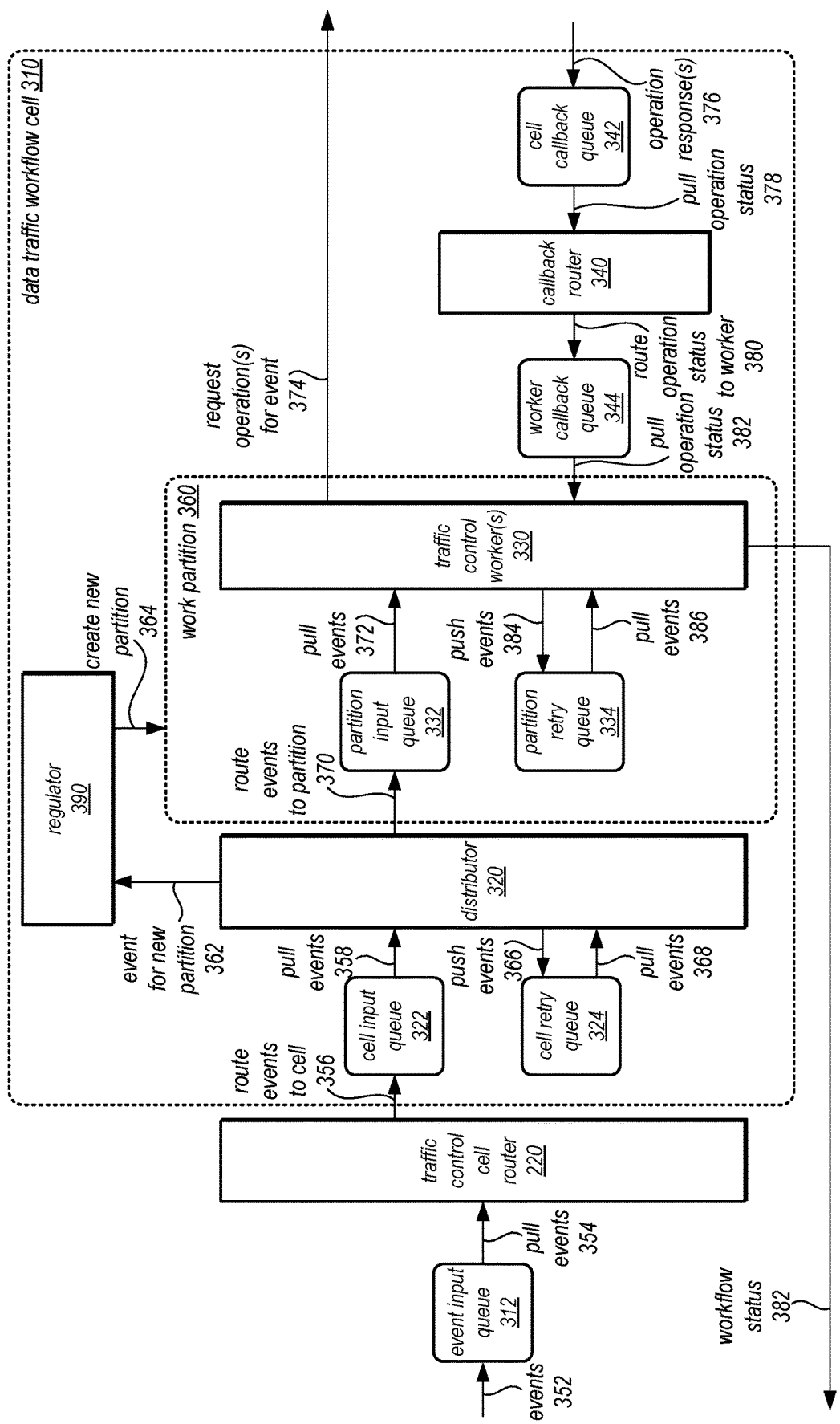
FIG. 3 is a logical block diagram of a data traffic workflow cell of a data traffic workflow management service among other services, according to some embodiments.

As discussed above, a data traffic workflow cell may provide a unit for handling some data traffic workflow events. FIG. 3 is a logical block diagram of a data traffic workflow cell of a data traffic workflow management service among other services, according to some embodiments. An event may be triggered that causes a data traffic workflow. These events may be received, as indicated 352, and stored in an event input queue 312 for data traffic workflow cell 310. For example, a data collection (e.g., bucket, container, blob, etc.) may have replication enabled, which triggers a replication data workflow when the data collection is changed (e.g., when an object is added to a source collection on a replication enabled collection). The storage service for the collection (or a monitoring or other service) may detect the change and provide (e.g., send, push, publish, etc.) information about the change to a traffic cell router (e.g., traffic control cell router 220), which may identify data traffic workflow cell 310 as the cell handling the replication workflow event.

In various embodiments, the traffic control router 220 may pull the event 354 from event input queue 312 and route 356 the event to cell 310 by placing the event into cell input queue 322. As distributor 320 can handle received events from cell input queue 322, such events can be handled in asynchronous fashion allowing, for instance, traffic control cell router 220 to return to routing other events (e.g., to other cells). Distributor 320 can read and pull 358 events from cell input queue 322 when the cell can handle the traffic. Distributor 320 may dispatch the event to the assigned work partition, such as work partition 360, by routing the vent to partition input queue 332, as indicated at 370. For example, different data traffic workflow events for the same workflow, account, user, source object, and/or source destination may be assigned to the same work partition. Therefore, for some events, a work partition already exists. For events where a work partition does not exist (e.g., cannot be found in a partition mapping or other information provided by regulator 390), then distributor 320 may request a new partition for the event, as indicated at 362, from regulator 390. Regulator 390 may create the data structures, files, or objects for a new partition (e.g., in a separate data store), such as partition input queue 332 partition retry queue 334, worker callback queue 344, make the assignment to traffic control worker(s) 330 (e.g., based on known loads on the traffic control workers 330 for other work partitions already assigned to those traffic control workers 330), and perform various other configuration operations (e.g., configuring or request the resources from a remote performance location) to create new partition 364.

Figure 4:
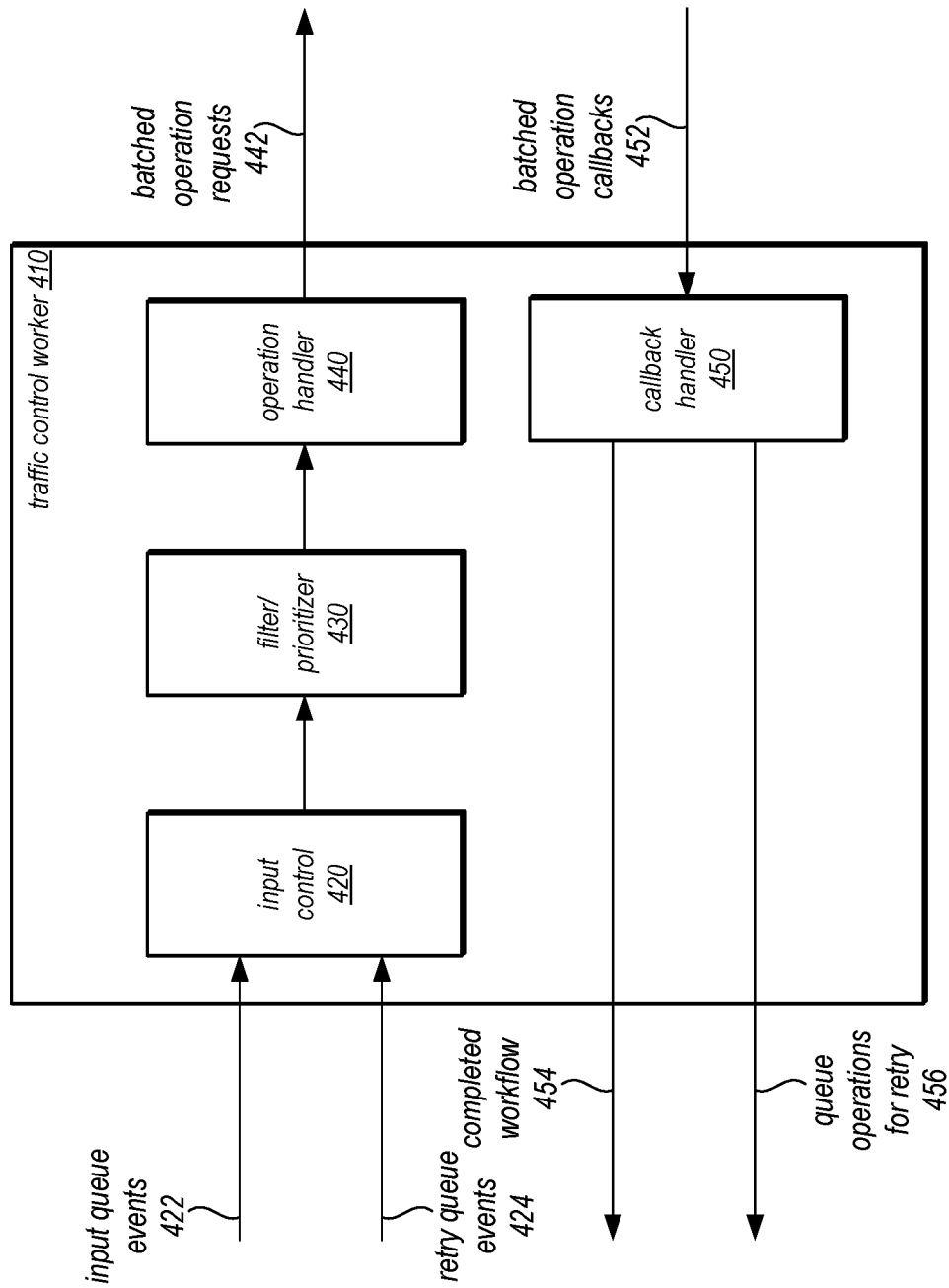
FIG. 4 is a logical block diagram of a traffic control worker, according to some embodiments.

As discussed in further detail with regard to FIG. 4, traffic control worker(s) 330 assigned to partition 360 may pull events 372 from partition input queue 332. In some embodiments, a single worker may pull a single event to perform the operations of that workflow so that redundant worker is not performed by multiple traffic control workers 330. Traffic control worker 330 may prepare, prioritize, batch, and or otherwise send operation requests, as indicated 374 to a remote performance location. The system(s) or service(s) (e.g., remote performance locations 252 in other services 250 in FIG. 2) that handle the requests may perform (or fail to perform) the requested operation(s), collect successes/errors and may, in some embodiments, return the success/errors in one or more responses 376 (which may be called a callback in some embodiments). In some embodiments, the response 376 may be a response for a batch of operations for a workflow.

Operations responses 376 may be stored in cell callback queue 342, in some embodiments. Callback router 340 may parse, demultiplex, or otherwise interpret responses pulled 378 from cell callback queue 342 and route the operation status 380 to the traffic control worker that requested the operations (e.g., as callback router 340 may route requests for multiple and/or all work partitions in data traffic workflow cell 310, in some embodiments). For example, routing an operation response to traffic control worker 330 may be writing it to worker callback queue 344 (which may be a host specific callback queue of the host that originated the operations being called back). Traffic control worker(s) 330 may then pull operation status 382 from worker callback queue 344. Workflow status 382 indications may be sent, stored, or otherwise communicated to provide completion, failure, or individual workflow portion updates to one or multiple systems (e.g., in a system that tracks workflow performance to prevent redoing work if a traffic control worker 330 fails but a portion of the workflow was completed successfully). For failed operations, traffic control worker(s) 330 may push events 384 to partition retry queue 334. Partition retry queue 334 may be read and pulled from 386 by traffic control worker(s) 330 (which may or may not be the same worker that first attempted the operation), in some embodiments.

FIG. 4 is a logical block diagram of a traffic control worker, according to some embodiments. Traffic control worker 410, similar to traffic control workers 330 in FIGS. 3 and 236 in FIG. 2, may handle operations for a data traffic workflow submitted to a work partition. In various embodiments, traffic control worker 410 may implement various processing stages for handling different requests. For example, traffic control worker 410 may implement input control 420 to handle queued events 422 from an input queue and queued events 424 from a retry queue, in various embodiments. Input control 420 may poll or otherwise read from input and retry queues which may be selected according to rate limiting or other traffic shaping techniques to balance performing new events from input queue and events to be retried from retry queue in order to meet respective performance requirements of each event, in some embodiments. For example, round-robin, priority queues, or other selection schemes may be implemented to ensure that each queue is pulled from in order to prevent an event from being held in the input queue too long. As multiple workers may pull the queues, input selection may be determined based on information provided by a regulator, such as regulator 390 or 220 (which may identify which queue needs to be service or provide priority, pending times, or other information to make a selection of input). Input control 420 may also perform various splitting, parsing, formatting or other processing of events in order to ready the event for performance.

Traffic control worker may implement filter/prioritizer 430, in some embodiments. Filter/prioritizer 430 may be implemented to remove or stop performance of events that satisfy different criteria. For example, a rejection analysis may identify a change status for an event (e.g., an event that is no longer eligible to be performed due to timeout, errors, etc.). In some embodiments, filter/prioritizer 430 may implement various other criteria for sidelining traffic (e.g., throttling traffic) by sending that event to a retry queue (e.g., if received from an input queue). In some embodiments, events may be blacklisted or otherwise automatically dropped (e.g., based on a source, identifier, or other information that indicates that a blacklist criteria is satisfied by an event). Filter/prioritizer 430 may also apply various weighting or priority schemes for those events not filtered to be placed in a priority queue for performance. For example, traffic workload (e.g., amount of data, location of data, amount of work to perform the event, etc.) and a performance requirement for the data traffic workflow (e.g., completion time, resource consumption limitation, etc.) may be considered to determine the priority value for the event when placing the event in the priority queue. In some embodiments, downstream dependencies for handling operations for an event may be considered when determining priority. For example, if a system or service that handles one (or more) operations for a data traffic workflow is unavailable (or indicating that it is overloaded via backpressure or other indications), then the operations directed to that service may be lowered in priority in order to advance the performance of other operations that may not have to wait on a different downstream system or service in order to be performed.

In various embodiments, traffic control worker 410 may implement operation handler 440, which may ready and send operations as batch requests 442. For example, traffic control worker 410 may read an event from a priority queue of prioritized events, prepare a batch of requests for the work partition (which may or may not be operations related to the same data traffic workflow), perform various encryptions, digest values, or other batch identification operations which can be used to track the status of a batch of operations (e.g., "pending", "sent", "acknowledged", and "completed"). Operation handler 440 can provide back-pressure or other signals to input control 420 (or other data traffic workflow cell components that the traffic control worker is "busy" or already at capacity when a number of in-flight or retry batches more than some threshold value is met, in some embodiments. Operation handler 440 may format requests according to the interface of the service or system at the remote performance location and send the request to perform the batch of requests, in some embodiments. Operation handler 440 may send requests 442 at a rate specified by a regulator (e.g., regulator 390 in FIG. 3), in some embodiments.

In various embodiments, traffic control worker 410 may implement callback handler 450 to handle batched operation callbacks 452. Batched operation callbacks 452 may indicate the success, failure, and/or errors of operations requested in a batch, in some embodiments. Callback handler 450 may obtain the batched operation callback from a cell callback queue, as discussed above with regard to FIG. 3, in some embodiments. Callback handler 450 may identify which batch operation request the callback corresponds to (e.g., by matching digest values or other batch operation identifiers), in some embodiments. Callback 450 handler may send completed workflow 454 (or failed workflow) indications to an event source or other system or service that acts based on the completion (or not) of a data traffic workflow. Callback handler 450 may collect or determine performance metrics for batches (or individual operations), in some embodiments, and send or store them (e.g., to a metrics data store). In some embodiments, callback handler 450 may identify failed operations for retry and queue the failed operations, as indicated at 456 for retry.

Although FIGS. 2-4 have been described and illustrated in the context of a data traffic workflow management service, the various techniques and components illustrated and described in FIGS. 2-4 may be easily applied to other data traffic workflow management systems in different embodiments for one or multiple different systems or services, which may be public or private. As such, FIGS. 2-4 are not intended to be limiting as to other embodiments of a system that may implement dynamically managed data traffic workflows.

Various different systems and devices may implement the various methods and techniques described below, either singly or working together. For example, data traffic workflow management service such as described above with regard to FIGS. 2-4 may be configured to implement the various methods. Therefore, the above examples and or any other systems or devices referenced as performing the illustrated method, are not intended to be limiting as to other different components, modules, systems, or configurations of systems and devices.

Figure 5:
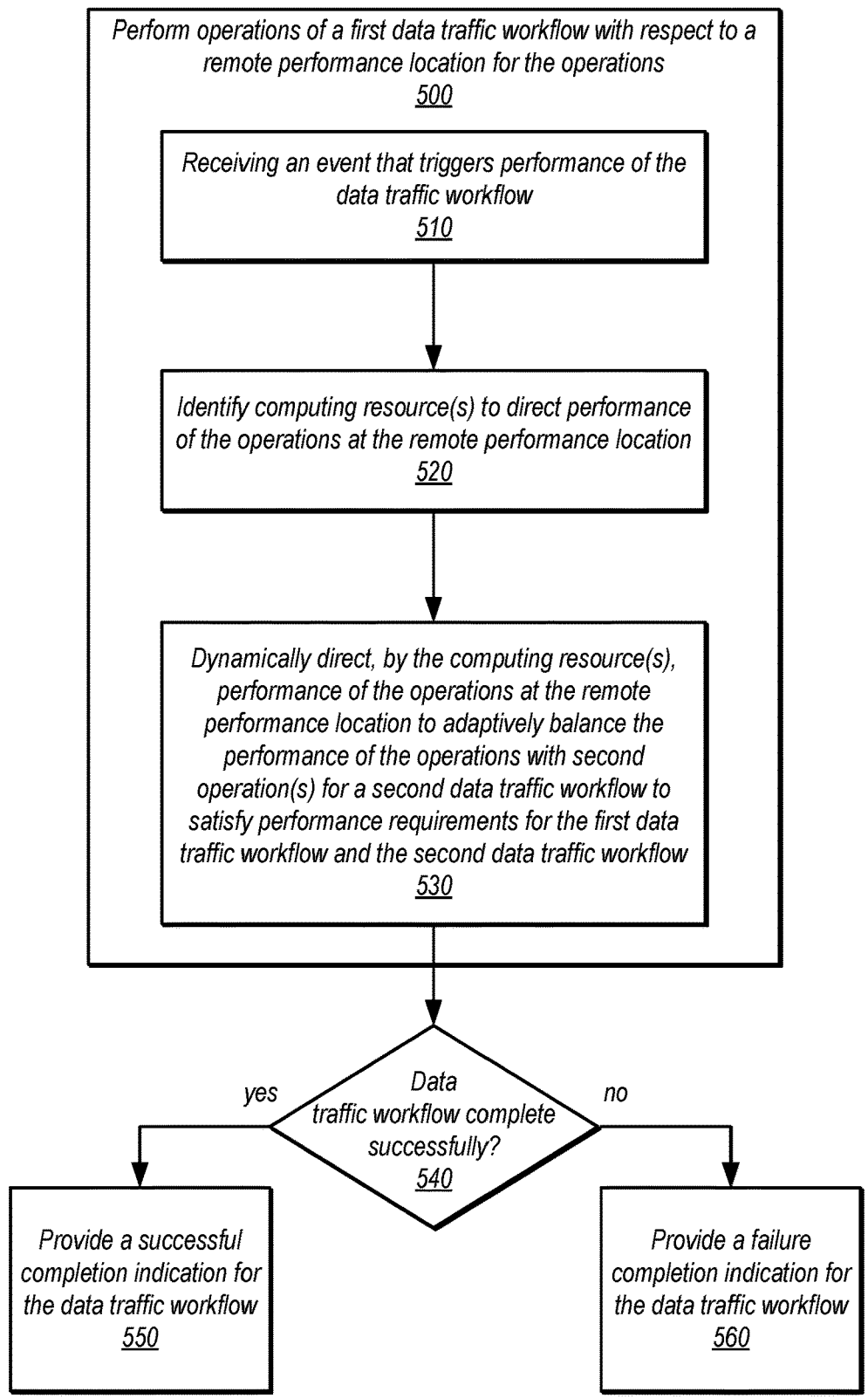
FIG. 5 is a high-level flowchart illustrating various methods and techniques to implement dynamically managed data traffic workflows, according to some embodiments.

FIG. 5 is a high-level flowchart illustrating various methods and techniques to implement dynamically managed data traffic workflows, according to some embodiments. As indicated at 500, operations of a first data traffic workflow may be performed with respect to a remote performance location for the operations, in various embodiments. For example, different types of systems or services, or geographically distributed systems or services of the same type (e.g., same type of storage system in different regions as discussed above with regard to FIG. 2) may perform data traffic workflows as part of implementing various features, such as data replication, Extract Transform Load (ETL) jobs, analysis or updates that take data or data derived from data in one location to generate data or derive data in another location, and so on. These workflows may include multiple types of operations and may include multiple dependencies between operations, in some embodiments. For example, a replication task may include operations such as, creating a container for an object, copying the object, labeling the object or sending an object creation notification, etc. These data traffic workflows may not be locally performed by the system or service implementing the feature. Instead, an event that triggers performance of the data traffic workflow may be generated and consumed by a system or service that coordinates performance of the data traffic workflow at the remote location.

As indicated at 510, an event that triggers performance of the first data traffic workflow may be received, in some embodiments. As discussed above with regard to FIGS. 2-4, input queues for events may be implemented, in some embodiments, to provide for asynchronous handling of data traffic workflows. Receiving the event may include receiving the event directly or indirectly from the source of the event by obtaining the event from an input queue, in some embodiments. The event may describe the operations to perform the data traffic workflow, in some embodiments (or may describe where to obtain the information to perform the data traffic workflow, in some embodiments).

As indicated at 520, computing resource(s) to direct performance of the operations at the remote performance location may be identified, in some embodiments. For example, the computing resources may be provisioned or assigned from a fleet of available computing resources that can direct operation performance (e.g., traffic control workers as discussed above with regard to FIGS. 2-4 above or other resources that are capable of accepting and directing performance of assigned operations at remote performance locations). As discussed in detail below with regard to FIG. 6 (and above with regard to FIGS. 2 and 3), workflow partitions may be used, in some embodiments, to provide assignments and asynchronous data structures (e.g., input and retry queues) may be implemented for determine when to perform operations, in some embodiments.

As indicated at 530, the computing resource(s) may dynamically direct performance of the operations at the remote performance location to adaptively balance performance of the operations with second operation(s) for a second data traffic workflow to satisfy performance requirements for the data traffic workflow and the second data traffic workflow, in some embodiments. For example, different filters, traffic shaping controls, prioritization schemes and other criteria for selecting and sending operations from the computing resources may be applied in order to ensure that operations for no one data traffic workflow (out of multiple data traffic workflows) are starved or otherwise not allowed to complete as a result of another data traffic workflow. As discussed above with regard to FIGS. 3 and 4 and below with regard to FIG. 6, different queues or other data structures that support asynchronous handling of operations, responses, errors, successes, and retries may be implemented to support balanced input and output from the computing resources with respect to operations of data traffic workflows. As discussed in detail below with regard to FIG. 7, prioritization schemes may be applied to determine priority values for performing operations associated with an event as part of the possible techniques implemented by computing resources to meet performance requirements for the data traffic workflows, in some embodiments.

As indicated at 540, a determination may be as to whether a data traffic workflow completed successfully, in some embodiments. For example, as discussed below with regard to FIG. 7, callbacks or other responses from the remote performance location may be received and evaluated in order to determine whether a data traffic workflow can complete (but needs to retry), cannot complete and is failed, or completed successfully. As indicated at 550, a successful completion indication may be provided, if the data traffic workflow completed successfully. If not, then a failure completion indication may be provided, as indicated at 560, in various embodiments.

Figure 6:
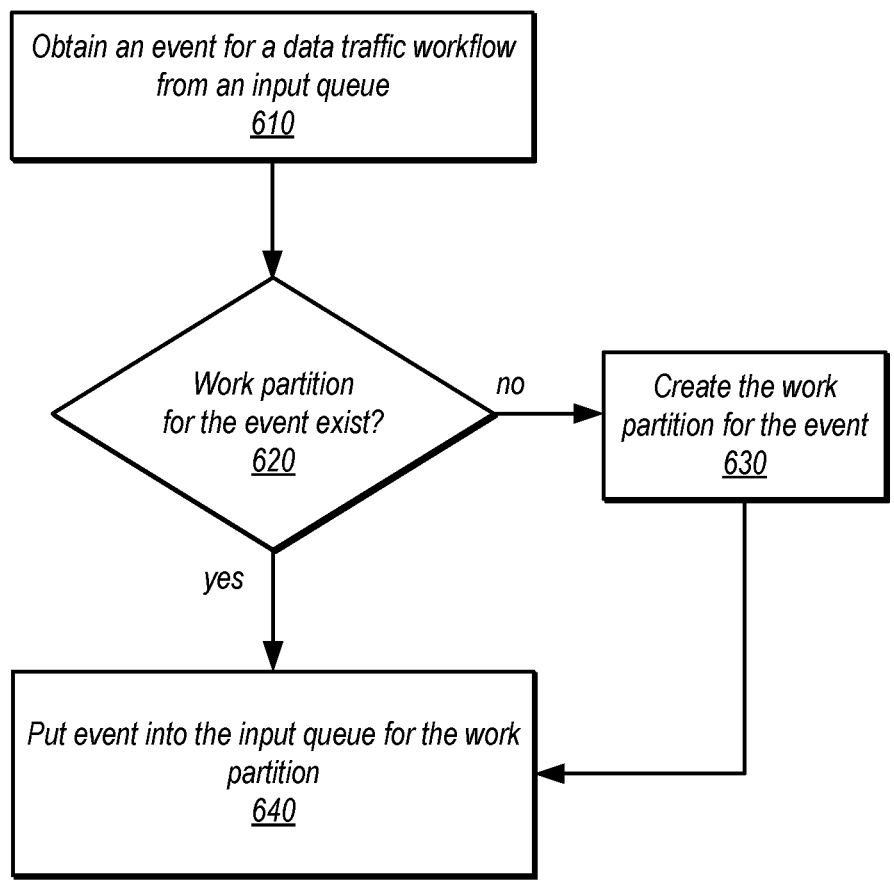
FIG. 6 is a high-level flowchart illustrating various methods and techniques to implement routing events for data traffic workflows to work partitions, according to some embodiments.

FIG. 6 is a high-level flowchart illustrating various methods and techniques to implement routing events for data traffic workflows to work partitions, according to some embodiments. As indicated at 610, an event for a data traffic workflow may be obtained from an input queue, in some embodiments. For example, as discussed above with regard to FIG. 3, an input queue for a data traffic workflow cell could be implemented to perform different events for different data traffic workflows across multiple different work partitions.

A determination may be made as to whether a work partition exists for the event, as indicated at 620, in some embodiments. For example, a local index, routing table, or other information describing existing work partitions and/or mapping information to determine whether an event is to be routed to one of the existing work partitions may be evaluated. In some embodiments, a request to a central routing authority, such as a regulator of a data traffic workflow cell as discussed above with regard to FIG. 3 may be made, which may receive an identified work partition (which may be existing).

If a partition does not exist, then the work partition for the event may be created, in some embodiments. For example, the various asynchronous data structures (e.g., input queue, retry queue, callback queue, etc.) may be created as tables in a database which can be accessed by assigned resources (e.g., traffic control workers), communications to perform remote operations may be established, remote resources reserved or identified, credentials or authorization obtained, and/or various other preparations to perform operations for a data traffic workflow may be completed. Assignment of computing resources to the created work partition may be performed, such as assigning traffic control workers to the work partition by sending assignment communications with the location of input queues or other data structures for the work partition to the assigned traffic control workers (e.g., via heartbeat or other communication techniques), in some embodiments. Once created (or if already existing as indicated by the positive exit from element 620), the event may be put into the input queue for the work partition, as indicated at 640, in some embodiments.

Figure 7:
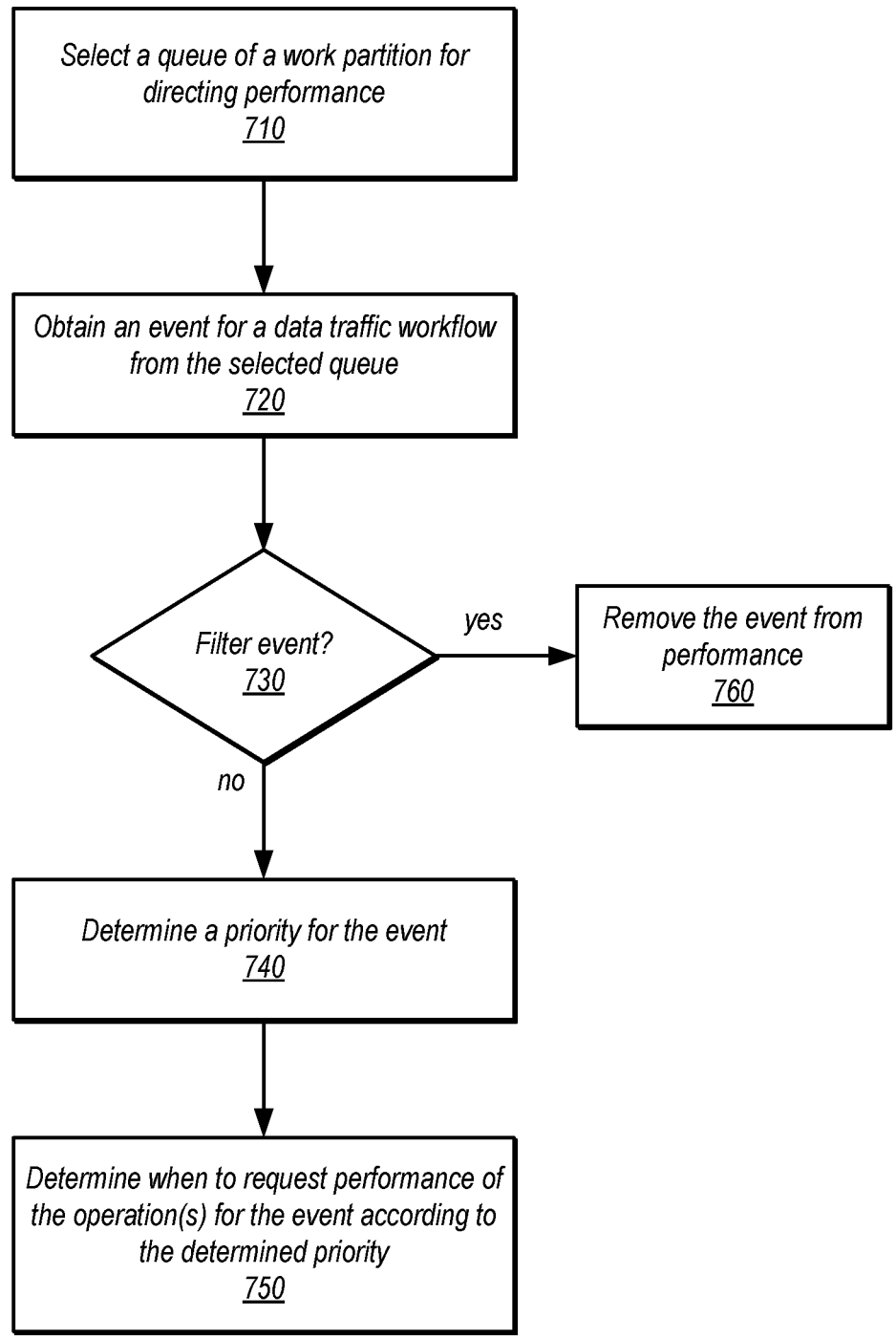
FIG. 7 is a high-level flowchart illustrating various methods and techniques to implement dynamically directing performance of events for data traffic workflows, according to some embodiments.

FIG. 7 is a high-level flowchart illustrating various methods and techniques to implement dynamically directing performance of events for data traffic workflows, according to some embodiments. As indicated at 710, a queue of a work partition may be selected for directing performance, in some embodiments. For example, an evaluation of a performance requirement for an incomplete or outstanding event for a data traffic workflow may be considered (e.g., a time remaining to complete before a time limitation). As noted above, different queues, such as an input queue or retry queue may be considered. In some embodiments, other queues, such as a throttle queue, may be considered. As indicated at 720, an event for a data traffic workflow may be obtained from the selected queue, in some embodiments. For instance, the queue may be read and an event selected according to a queue order, such as a FIFO queue ordering so that the next event in the selected queue may be obtained.

As indicated at 730, a determination may be made as to whether the event should be filtered, in some embodiments. For example, some events may be erroneously sent or queued (e.g., an event that identifies an unsupported object or operation to be performed). In some embodiments, events for certain sources (e.g., certain users, accounts, systems, operations) may be blacklisted from performance. As indicated at 760, filtered events may be removed from performance.

As indicated at 740, a priority may be determined for an event, in some embodiments. For example, priority may be a value, weight, or ranking of the event based on various factors, such as the estimated resource usage to perform the event and/or the estimated time to perform the event, performance criteria for the event, such as a time limitation for performing an event (e.g., an event must be performed in 15 minutes or less). In some embodiments, prioritization may be determined based on the queue from which the event was obtained. For example, a throttle queue event may be given a lower value than an event with similar characteristics from another queue, whereas in another example a retry queue event may be given a higher value than an event with similar characteristics from an input queue. In some embodiments, an evaluation of dependencies for performing operations associated with the event may be used to determine the priority. For example, status information for remote systems or services may be compared with operation(s) specified for an event to determine whether the event can be completed at the remote systems or services (e.g., status information indicates that the service is unavailable).

As indicated at 750, a determination of when to request to performance of the operation(s) for the event may be made according to the determined priority, in some embodiments. For example, as discussed above, a priority queue could be used to select queued events according to the next event to send in priority. In some embodiments, priority may determine different transmission queues (e.g., high priority, medium priority, and low priority) with the frequency at which operations for an event being requested according to the priority of the queue.

Figure 8:
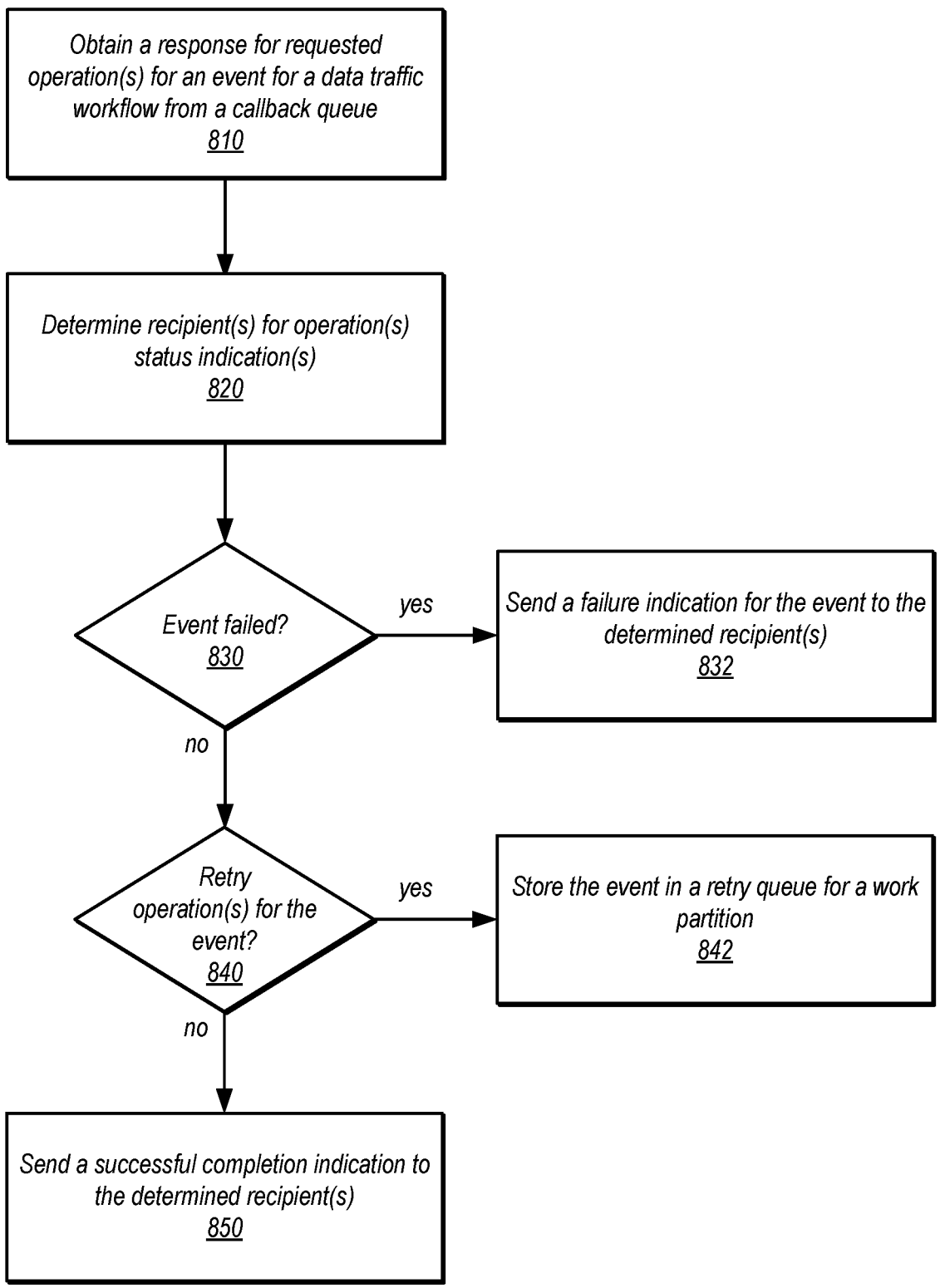
FIG. 8 is a high-level flowchart illustrating various methods and techniques to implement handling responses to requested operations for a data traffic workflow from a callback queue, according to some embodiments.

FIG. 8 is a high-level flowchart illustrating various methods and techniques to implement handling responses to requested operations for a data traffic workflow from a callback queue, according to some embodiments. As indicated at 810, a response for requested operation(s) for an event for a data traffic workflow may be obtained from a callback queue, in some embodiments. The response may indicate a status of the requested operations, in some embodiments. As indicated at 820, recipient(s) for operation(s) status indication(s) may be determined, in some embodiments. For example, different data traffic workflows may have different failure (or success) handling components, which may retry or report failures. Identification of the recipient in such an example may identify an interface, network endpoint, or other way to send the failure status indication to the appropriate handling component. In various embodiments, recipient(s) may be configured as part of a data traffic workflow (e.g., as part of workflow metadata) which may be obtained by an asynchronous data traffic workflow management system to perform the data traffic workflow.

In various embodiments, a status indication in a response may indicate whether the event has failed, as indicated at 830. A failed event may, for instance, be an event that cannot complete (e.g., due to various error scenarios such as a lack of permissions to perform one or more of the operations). A failed event may be an event that failed due to a remote system or remote service failure, in another example. If an event is determined to be failed, then as indicated at 832, a failure indication may be sent for the event to the determined recipient(s).

In some embodiments, an evaluation of the response may determine whether or not the operations for the event should be retried, as indicated at 840. For example, the operations may indicate error or failures of operations that could be successfully completed if retried (e.g., a timeout error). If the operation(s) may be retried, then as indicated at 842, the event may be stored in a retry queue for a work partition for the data traffic workflow, in some embodiments. As indicated at 850, an event that is not failed or retried may be successful. A successful completion indication may be sent to the determined recipient(s), in such embodiments.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 9:
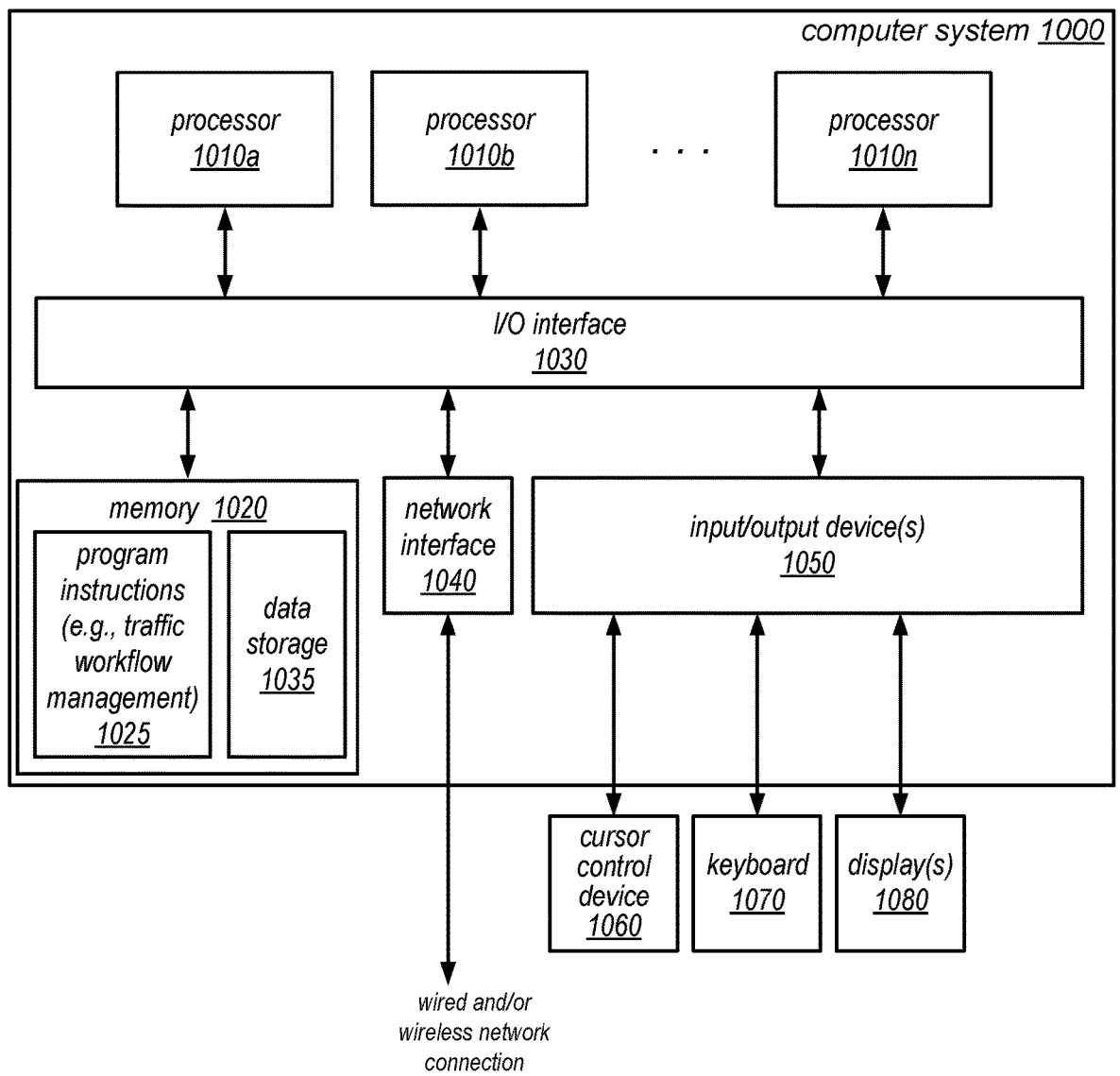
FIG. 9 illustrates an example system configured to implement the various methods, techniques, and systems described herein, according to some embodiments.

Embodiments of dynamically managed data traffic workflows as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of compute node, computing device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., various features, components, or techniques of asynchronous data traffic workflow management systems discussed above) are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 9, memory 1020 may include program instructions 1025, configured to implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, nodes within a data lineage system may present data lineage services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor cause the at least one processor to implement an asynchronous data traffic workflow management system, the asynchronous data traffic workflow management system configured to:
      receive an event that triggers performance of a first data traffic workflow;
      identify a work partition in which to perform the first data traffic workflow on a first one or more computing resources assigned to the work partition;
      adaptively select, by the first one or more computing resources assigned to the work partition, first operations for the first data traffic workflow to balance performance of the first operations on a second one or more computing resources at a performance location remote from the first one or more computing resources with second operations for a second data traffic workflow in order to satisfy respective performance requirements for the first data traffic workflow and the second data traffic workflow;
      send requests to the second one or more computing resources at the remote performance location to perform the first operations for the data traffic workflow; and
      after the first operations for the first data traffic workflow are performed on the second one or more computing resources at the remote performance location, provide an indication that the first data traffic workflow is complete.

2. The system of claim 1, wherein to adaptively select the operations for the first data traffic workflow, the asynchronous data traffic workflow management system is configured to:
   select one queue of the work partition; and
   obtain the event from the one queue.

3. The system of claim 1, wherein to adaptively select the operations for the first data traffic workflow, the asynchronous data traffic workflow management system is configured to:
   determine a priority for the event; and
   determine when to send the first operations for the event according to the priority.

4. The system of claim 1, wherein the asynchronous data traffic workflow management system is implemented as a data traffic workflow management service of a provider network, wherein the event for the data traffic workflow is to replicate one or more changes to a collection of data stored in a data storage service of the provider network in a first region to the data storage service of the provider network in a second region.

5. The method of claim 4, wherein dynamically directing performance of the first operations at the remote performance location comprises:
   determining a priority for performing the event; and
   determining when to send the first operations for the event according to the determined priority.

6. A method, comprising:
   performing first operations for a first data traffic workflow for the first operations, comprising:
      receiving an event that triggers performance of the first data traffic workflow;
      identifying one or more computing resources to direct performance of the first operations at a performance location remote from the identified one or more computing resources; and
      dynamically directing, by the identified one or more computing resources, performance of the first operations at the remote performance location to adaptively balance performance of the first operations for the first data traffic workflow with second operations for a second data traffic workflow to satisfy respective performance requirements for the first data traffic workflow and the second data traffic workflow; and
   after performing the first operations for the first data traffic workflow, providing an indication that the first data traffic workflow is complete.

7. The method of claim 6,
wherein identifying one or more computing resources to direct performance comprises:
   creating a work partition for the event, comprising:
      creating an input queue and a retry queue for the work partition;
      assigning the one or more computing resources to the work partition; and
   wherein the method further comprises putting the event into the input queue for the work partition.

8. The method of claim 6,
wherein identifying one or more computing resources to direct performance comprises:
   identifying an existing work partition for the event; and
   wherein the method further comprises putting the event into an input queue for the work partition.

9. The method of claim 6, wherein at least one of the first operations fails to complete successfully, and wherein dynamically directing, by the one or more computing resources, performance of the first operations at the remote performance location comprises:
   obtaining from a retry queue the at least one operation; and
   requesting again performance of the at least one operation at the remote performance location.

10. The method of claim 6, further comprising providing a failure indication for the second data traffic workflow to a determined recipient for the second data traffic workflow after determining that the second data traffic workflow failed to complete successfully.

11. The method of claim 6, wherein the one or more computing resources are assigned to a work partition identified for the event, and wherein the method further comprises modifying a number of computing resources assigned to the work partition based, at least in part, on a change in workload for the work partition.

12. The method of claim 6, wherein dynamically directing performance of the operations at the remote performance location comprises:
   selecting one queue of plurality of queues that provide events for data traffic workflow performance; and
   obtaining the event from the selected one queue.

13. The method of claim 6, wherein dynamically directing performance of the first operations at the remote performance location comprises determining that the event does not satisfy a criterion to be filtered from performance.

14. One or more non-transitory, computer-readable storage media, storing program instructions that when executed on or across one or more computing devices cause the one or more computing devices to implement:
   receiving an event that triggers performance of a first data traffic workflow;
   identifying one or more computing resources assigned to a work partition to direct performance of the first data traffic workflow;
   dynamically directing, by the identified one or more computing resources, performance of first operations for the first data traffic workflow at a performance location remote from the identified one or more computing resources to adaptively balance performance of the first operations with second operations for a second data traffic workflow to satisfy respective performance requirements for the first data traffic workflow and the second data traffic workflow; and
   after performing the first operations for the first data traffic workflow, providing an indication that the first data traffic workflow is complete.

15. The one or more non-transitory, computer-readable storage media of claim 14, wherein, in dynamically directing performance of the first operations at the remote performance location, the program instructions cause the one or more computing devices to implement:
   selecting one queue of plurality of queues that provide events for data traffic workflow performance; and
   obtaining the event from the selected one queue.

16. The one or more non-transitory, computer-readable storage media of claim 14, wherein, in dynamically directing performance of the first operations at the remote performance location, the program instructions cause the one or more computing devices to implement:
   determining a priority for performing the event; and
   determining when to send the operations for the event according to the determined priority.

17. The one or more non-transitory, computer-readable storage media of claim 14, wherein, in dynamically directing performance of the first operations at the remote performance location, the program instructions cause the one or more computing devices to implement throttling performance of an event for a third data traffic workflow.

18. The one or more non-transitory, computer-readable storage media of claim 14,
   wherein, in identifying the work partition to perform the first data traffic workflow at one or more computing resources assigned to the work partition, the program instructions cause the one or more computing devices to implement:
      creating the work partition for the event, comprising:
         creating an input queue and a retry queue for the work partition;
         assigning the one or more computing resources to the work partition; and
   wherein the one or more non-transitory, computer-readable storage media store further instructions that when executed on or across the one or more computing devices cause the one or more computing devices to further implement putting the event into the input queue for the work partition.

19. The one or more non-transitory, computer-readable storage media of claim 14, wherein at least one of the first operations fails to complete successfully, and wherein dynamically directing, by the one or more computing resources, performance of the first operations at the remote performance location comprises:
   obtaining from a retry queue the at least one operation; and
   requesting again performance of the at least one operation at the remote performance location.

20. The one or more non-transitory, computer-readable storage media of claim 14, wherein the one or more computing devices are implemented as part of a provider network, wherein the event for the first data traffic workflow is to replicate one or more changes to data stored in a data storage service of the provider network in a first region to the data storage service of the provider network in a second region.

* * * * *